C. H. McCormick.

Harvester Cutter.

No. 976 Reissued Jun. 5, 1860.

UNITED STATES PATENT OFFICE.

C. H. McCORMICK, OF CHICAGO, ILLINOIS.

IMPROVEMENT IN CUTTING APPARATUS OF MACHINES FOR CUTTING GRASS, &c.

Specification forming part of Letters Patent No. 21,573, dated September 21, 1858; Reissue No. 976, dated June 5, 1860.

DIVISION B.

*To all whom it may concern:*

Be it known that I, CYRUS H. McCORMICK, of Chicago, in the county of Cook and State of Illinois, have invented certain new and useful Improvements in the Cutting Apparatus of Machines for Cutting Grass and Grain, of which the following is a full, clear, and exact description, reference being had to the accompanying drawings, which make part of this specification, and in which—

Figure 1:
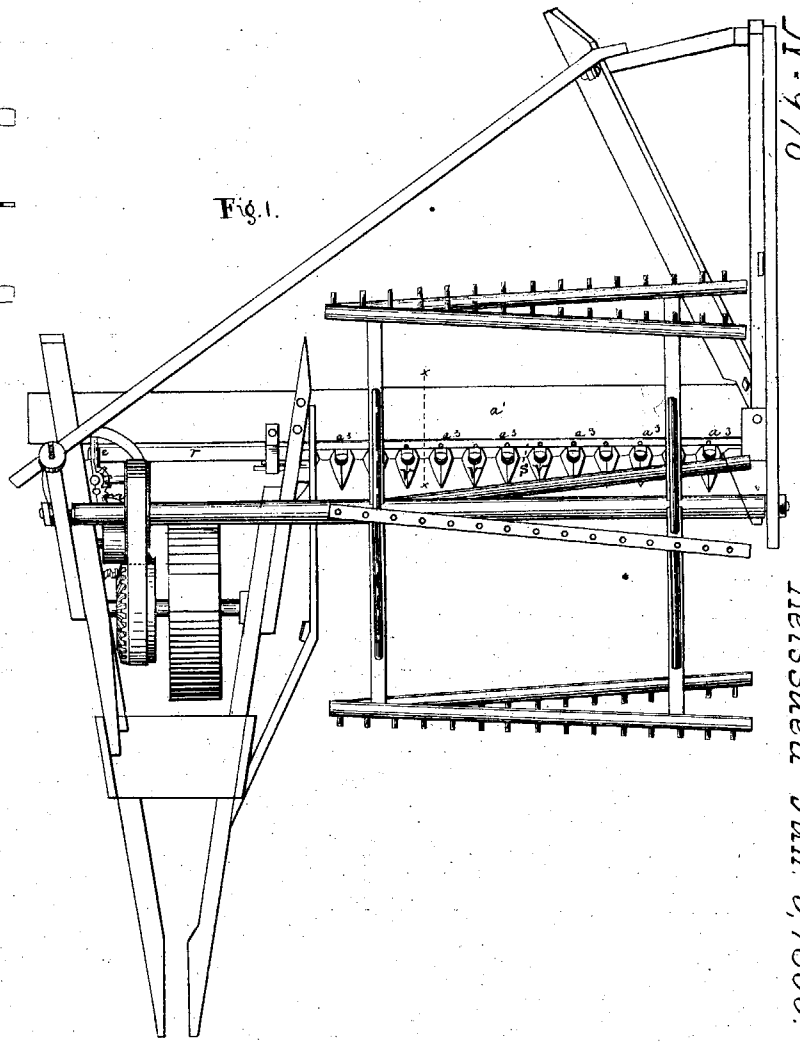
Figure 2:
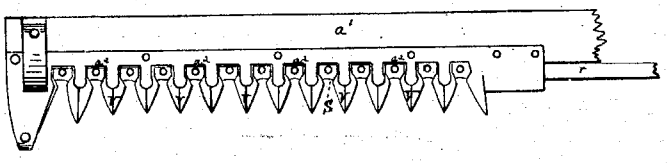
Figure 3:
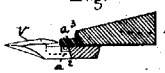
Figure 4:
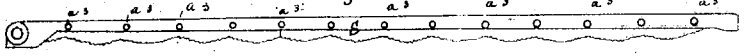

Figure 1 represents a plan of a McCormick mowing-machine embracing my said improvements. Fig. 2 represents a view of the under side of the beam and cutting apparatus detached from the machine. Fig. 3 represents on an enlarged scale a section at the line $x\,x$ of Fig. 1 through the cutter and the finger-beam, the guard or finger being shown in elevation. Fig. 4 represents a plan of the upper side, Fig. 5 an elevation of the back, and Fig. 6 a plan of the under side, of the cutter.

That kind of cutting apparatus for mowing-machines which consists of a scalloped cutter playing through a series of slotted guards or fingers has always been liable to clog by the winding of fibrous matters round the cutter-bar and fingers, or by the lodgment of such matter in the slots of the fingers. The improvement which is claimed under this patent has for its object the prevention of these difficulties; and it consists in fitting a vibrating scalloped cutter with spurs or projections, or the equivalent thereof, on both its upper and under sides, and so shaping the slots or openings in the guards for the cutter to play in that the said projections may vibrate through the same, that the reciprocal action of the projections and fingers may detach and discharge the clogging matter from both the cutter and fingers.

In the accompanying drawings, $a'$ denotes the finger-beam; V, the slotted guards; S, the vibrating scalloped cutter, which plays through the slots or openings in the guards; $r$, a connecting-rod, which at one end is jointed to the cutter and at the other is joined to a crank, $e$, which in the usual manner gives to the cutter a vibrating motion, so as to cause the spurs or projections on the upper and under sides of the cutters to pass back and forth through the guards.

Figure 5:
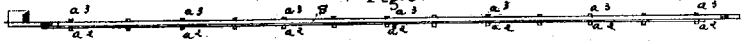
Figure 6:
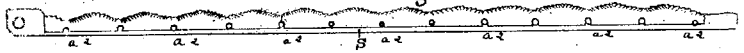

The projections $a^3$ on the upper side of the cutter and the projections $a^2$ on the under side of the cutter are seen in the back elevation, Fig. 5, and cross-section, Fig. 3, of the cutter. These projections are formed in this instance by making a series of holes through the cutter, the distance between the centers of the holes equaling the distance between the middle lines of the fingers, and inserting in the holes thus made a series of pins long enough to project the required distance beyond the bar on one side and the blade on the other. I have found a projection varying from one-eighth of an inch to three-eighths of an inch to answer very well; but I prefer the projection of the pin to be about one-quarter of an inch on the lower side and about one-eighth of an inch on the upper side. The ends of the pins should be cut off square to leave the corners sharp, that they may detach clogging matter more readily. The pins should be arranged upon the bar so as to match the openings left in the fingers for them to play through.

I have shown the application of the improvement herein claimed to a McCormick mowing-machine; but I have only described such parts of the machine as are necessary to a proper understanding of the improvement.

What I claim under this patent as my invention is—

The combination of a series of slotted fingers with a vibrating scalloped cutter having projections on both its upper and under sides to facilitate the detachment and discharge of clogging matter, substantially as described.

In testimony whereof I have hereunto subscribed my name.

C. H. McCORMICK.

Witnesses:

C. D. WOLF,

BRADFORD SLOAT.